United States Patent [19]
Tanaka

[11] Patent Number: 5,615,993
[45] Date of Patent: Apr. 1, 1997

[54] METHOD OF REMOVING ARTICLES

[75] Inventor: Nobuhiro Tanaka, Saitama, Japan

[73] Assignee: Kao Corporation, Tokyo, Japan

[21] Appl. No.: 462,522

[22] Filed: Jun. 5, 1995

[30] Foreign Application Priority Data

Aug. 9, 1994 [JP] Japan .................................. 6-206149

[51] Int. Cl.$^6$ .................................................. B65B 69/00
[52] U.S. Cl. ........................ 414/786; 414/416; 414/412; 414/797; 414/752; 414/627; 83/946
[58] Field of Search ................................ 414/416, 417, 414/751, 752, 786, 411, 627, 412, 403, 796.9, 797, 911; 83/929, 946; 901/40

[56] References Cited

U.S. PATENT DOCUMENTS

| | | | |
|---|---|---|---|
| 2,353,736 | 7/1944 | Le Frank | 414/416 X |
| 3,750,804 | 7/1973 | Lemelson . | |
| 3,926,322 | 12/1975 | Scott | 414/412 |
| 4,768,640 | 9/1988 | Sticht | 414/416 X |
| 5,011,467 | 4/1991 | Traegaardh | 414/416 X |
| 5,101,703 | 4/1992 | Tanaka et al. | 414/412 X |
| 5,110,248 | 5/1992 | Asano et al. | 414/416 X |
| 5,144,789 | 9/1992 | Focke et al. | 414/416 X |

FOREIGN PATENT DOCUMENTS

| | | |
|---|---|---|
| 964608 | 3/1975 | Canada ................................. 414/416 |
| 0430176 | 5/1991 | European Pat. Off. . |
| 0553362 | 4/1993 | European Pat. Off. . |
| 3172230 | 7/1991 | Japan . |
| 710289 | 1/1995 | Japan . |

*Primary Examiner*—Frank E. Werner
*Attorney, Agent, or Firm*—Dvorak and Traub

[57] ABSTRACT

A method of removing a required number of articles from a packing box which is accommodating a plurality of articles and having one open side. The method includes a step of setting the orientation of the packing box with the open side directed side-wise, a step of sucking surfaces of the required number of articles in the packing box with sucking pads through the open side of the packing box directed side-wise, and a step of removing from the packing box the necessary number of articles sucked by the sucking pads.

2 Claims, 13 Drawing Sheets

FIG. 15B
PRIOR ART

METHOD OF REMOVING ARTICLES

BACKGROUND OF THE INVENTION

1. Field of the Invention

The present invention relates to a method of removing articles from packing boxes, such as cardboard boxes, in distribution centers or the like.

2. Description of the Background Art

Japanese Patent Laid-open Publication (JP-A) No. Hei 3-172230 discloses a method of removing a required number of articles from a packing box accommodating a plurality of articles and open on one side.

Figure 15A:
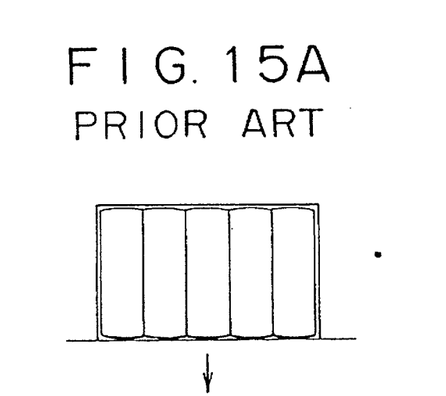
FIGS. 15A and 15B are schematic views illustrating a prior art example of picking out articles.
Figure 15B:
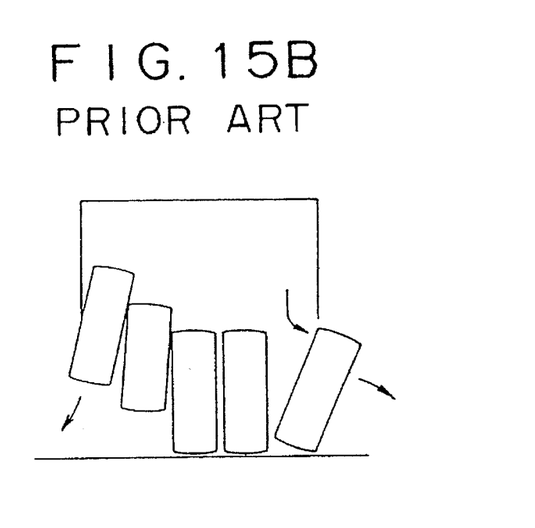

This prior art method comprises a first step of setting the packing box with articles therein such that the open side is directed down and causing all the accommodated articles to fall down and be discharged (FIG. 15A) and a second step of taking out a required number of articles among the articles discharge in the first step by sucking the articles with sucking pick-out means (FIG. 15B).

This prior art technique, however, has the following problems and disadvantages.

First, in the case when the packing box is closely filled with bag-like articles, it is difficult for the articles to neatly fall down naturally from the open side of the packing box disposed with the open side down because of negative pressure generated therein. Therefore, the articles fail to fall down in an orderly fashion, resulting in a disturbed array of the discharged articles. In this state, the discharge articles may not be sucked by the sucking pick-out means.

To permit discharge of the articles in an orderly fashion from the packing box, it is necessary to cause the articles to fall down slowly. Doing so reduces the productivity of the process.

Among the articles that have been discharged from the packing box, those which are comparatively tall and slender are unstable and may readily turn down. When articles are taken out progressively to leave only a small number of articles in the packing box, tall and slender articles may turn down so that they can no longer be sucked by the sucking pick-out means.

SUMMARY OF THE INVENTION

An object of the invention is to permit articles to be removed from packing boxes in a steady fashion and with high productivity.

According to the invention, there is provided a method of removing articles, in which a required number of articles are taken out from a packing box accommodating a plurality of articles and open on one side.

The method includes a step of setting the orientation of the packing box such that the open side thereof is directed side-wise, a step of sucking surfaces of the required number of articles in the packing box with sucking pick-out means via the open side of the packing box, and a step of taking out the required number of articles sucked by the sucking pick-out means by pulling the articles out of the packing box through the open side directed side-wise.

In the method of removing articles, the opening of the packing box on one side is formed under the following conditions (a) to (d):

(a) cutting a packing box in a plane perpendicular to one of the sides L, W and H of the box in the direction in which the number of rows of articles is least;

(b) where there are a plurality of sides in directions in which the number of articles in an array is least, cutting the box in a place parallel to the longest side;

(c) where the least number of articles in an array in (a) or (b) is an odd number, cutting an end surface of the box perpendicular to the side in (a) or (b); and (d) where the least number of articles in an array in (a) or (b) is an even number, cutting the side in (a) or (b) to 1/2 (i.e., bisecting the side).

Thus, according to the invention, it is possible to obtain the following effects and advantages.

Since articles are taken out in required numbers side-wise from the side-wise directed open side of the packing box by sucking and pulling action, even if negative pressure is generated in the packing box, the articles can be forcedly removed in an orderly fashion by the suction force. Thus, the posture of the articles after removal thereof can be readily stabilized.

Since the articles in the packing box are taken out successively from upper ones, those which remain in the packing box are supported by the same so that the array of the remaining articles is not disturbed. The articles in the packing box thus can always be subject to a stable forced pull-out force provided by the suction force.

The articles in the packing box are taken out forcedly in required numbers by forced pull-out force provided by the suction force. It is thus possible to provide a high removal rate, thus improving productivity.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Figure 1:
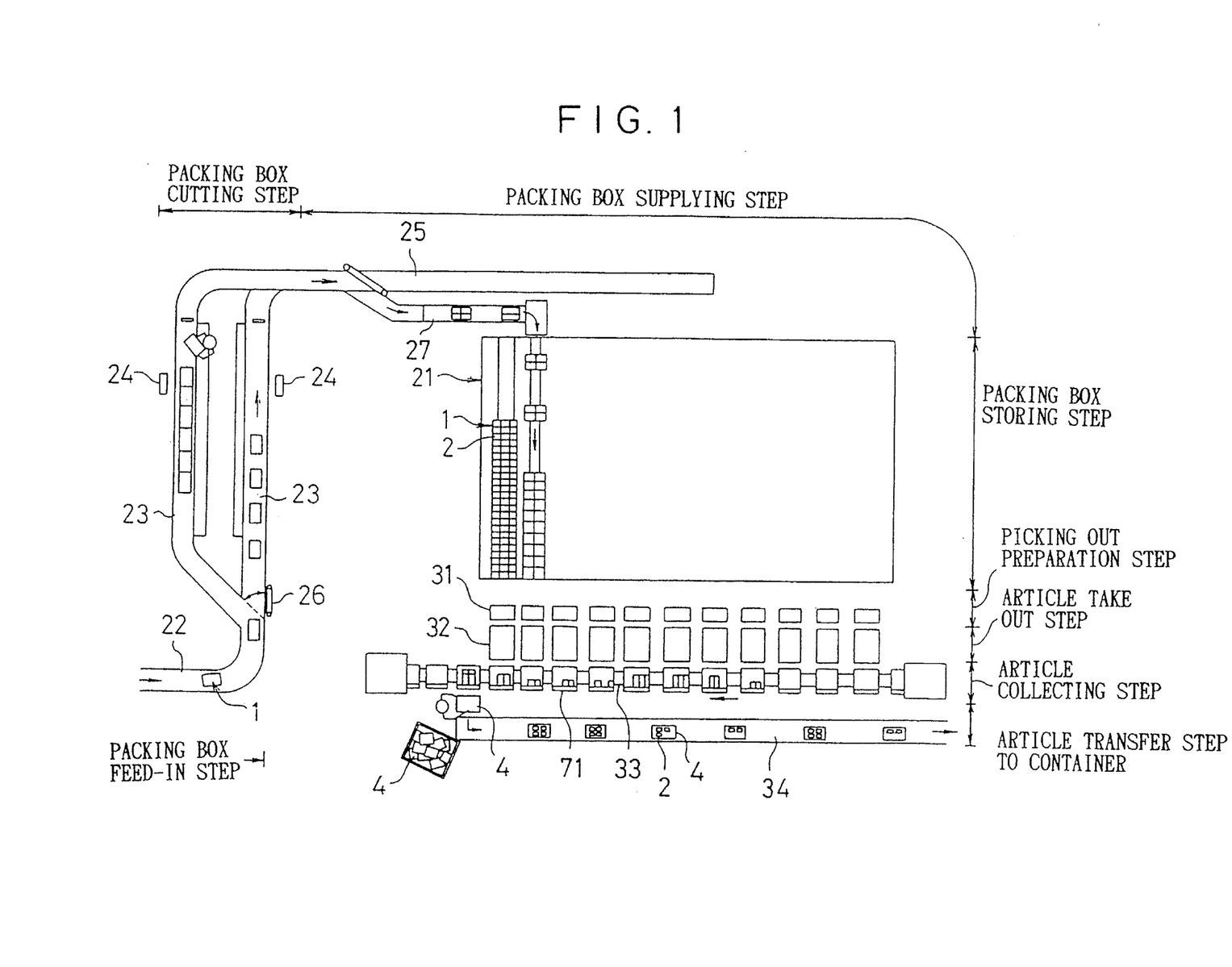
FIG. 1 is a view showing the layout of a picking apparatus incorporating the invention.

FIG. 1 shows pick-out equipment 10, which performs (A) a process of replenishing a movable shelf unit 21 with articles and (B) a process of taking out articles from the movable shelf unit 21. The individual processes will now be described.

(A) Process of Replenishing Movable Shelf Unit 21 with Articles

Figure 8:
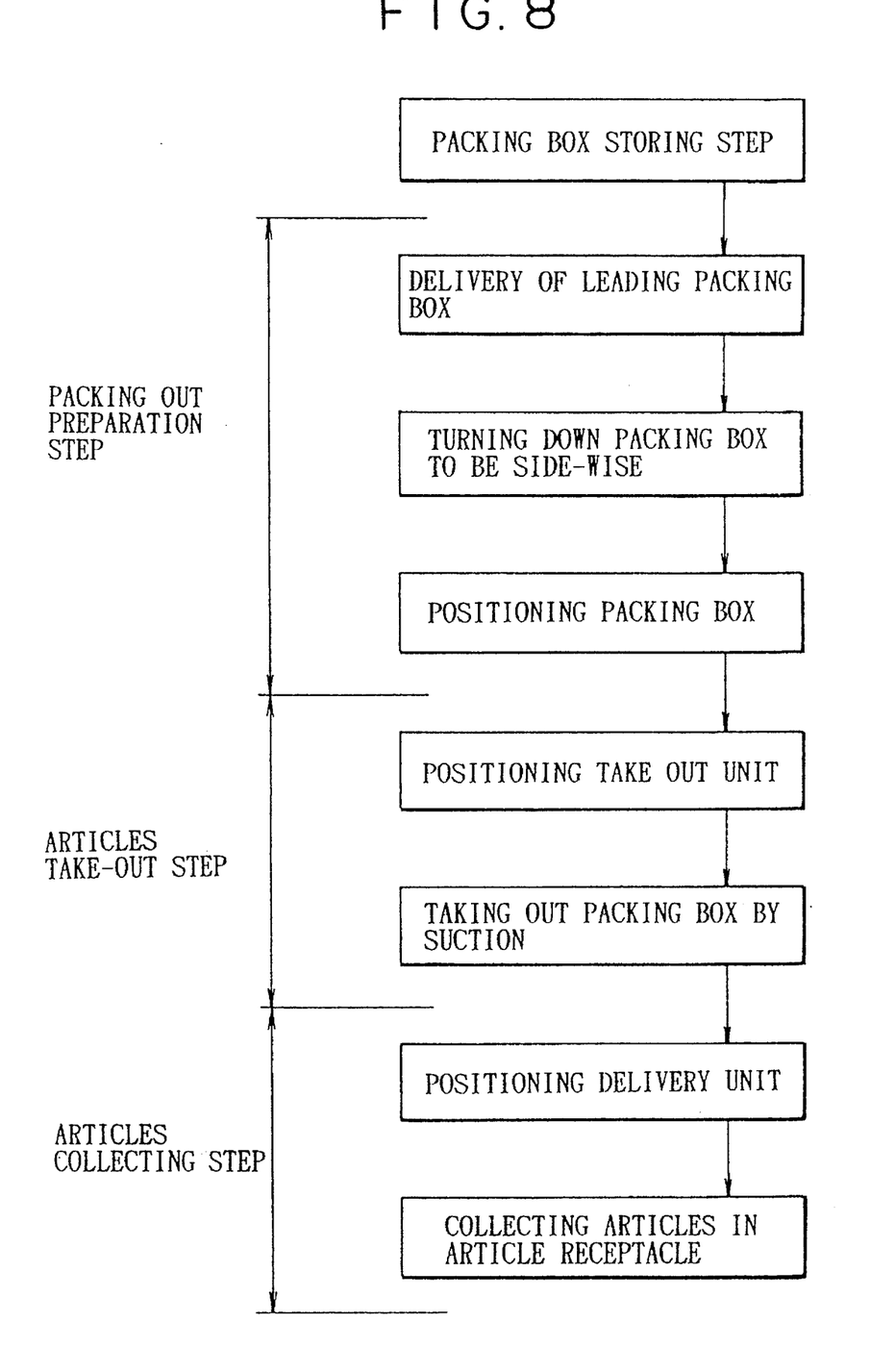
FIG. 8 is a view illustrating the process of picking out articles from the movable shelf unit.

The movable shelf unit 21 has an array of storage spaces arranged in a plurality of rows and a plurality of columns. It can store articles of different kinds in different storage spaces. When the emptiness of a certain storage space of the movable shelf unit 21 becomes more than that corresponding to one layer of articles in a pertinent pallet stack, the vacant storage space is replenished with one layer of packing boxes 1 with articles therein corresponding to one pallet stack layer. As shown in FIG. 8, this replenishment process has (1) a packing box feed-in step, (2) a packing box cutting step, (3) a packing box supplying step and (4) a packing box storing step. Now, equipment of each step will be described, and then the procedure of replenishing operation will be described.

(1) Packing Box Feed-in Step

A pick-out control computer can detect emptiness of a certain storage space, corresponding to one layer or more of a pertinent pallet stack, according to storage space stock information provided by an emptiness monitor of the movable shelf unit 21. The emptiness monitor is a real tinge monitor of the storage space stock status. When the computer outputs a supply request for the supply of articles of a pertinent kind according to the emptiness detection, the automatic pick-out equipment takes out packing boxes 1 corresponding to one layer and charges them onto a packing box conveyor 22. The packing boxes 1 are each accommodating a plurality of articles 2 in a scaled state.

(2) Packing Box Cutting Step

The packing boxes 1 which are conveyed by the packing box conveyor 22 are led to a cutting line 23 to be cut by the operator to form opening 3. The way of cutting is determined in advance for each kind of articles stored in a pertinent lower storage space of the movable shelf unit 21 and is registered in the computer. The computer displays cutting conditions (i.e., cutting information) about the kind of articles introduced to the cutting line 23 on a cutting information display 24. The operator cuts apart the packing boxes 1 in the manner as displayed. The cut packing boxes 1 are supplied to a supply line 25. There are provided two cutting lines 23 for the sake of productivity improvement. A switch 26 provided at the inlet of the two cutting lines 23 functions to introduce articles of kind A to one cutting line 23 and articles of kind B to the other.

The cutting conditions are determined as in (a) to (d) below such that articles 2 in a posture less liable to turn down when they are taken out from their packing box 1 (see FIGS. 9 and 10).

(a) The packing box 1 is cut in a plane perpendicular to one of its sides L, W and H in a direction in which the number of articles in an array is least.

(b) Where there are a plurality of sides in directions in which the number of articles in an array is least, the box is cut in a plane parallel to the longest side.

Figure 9:
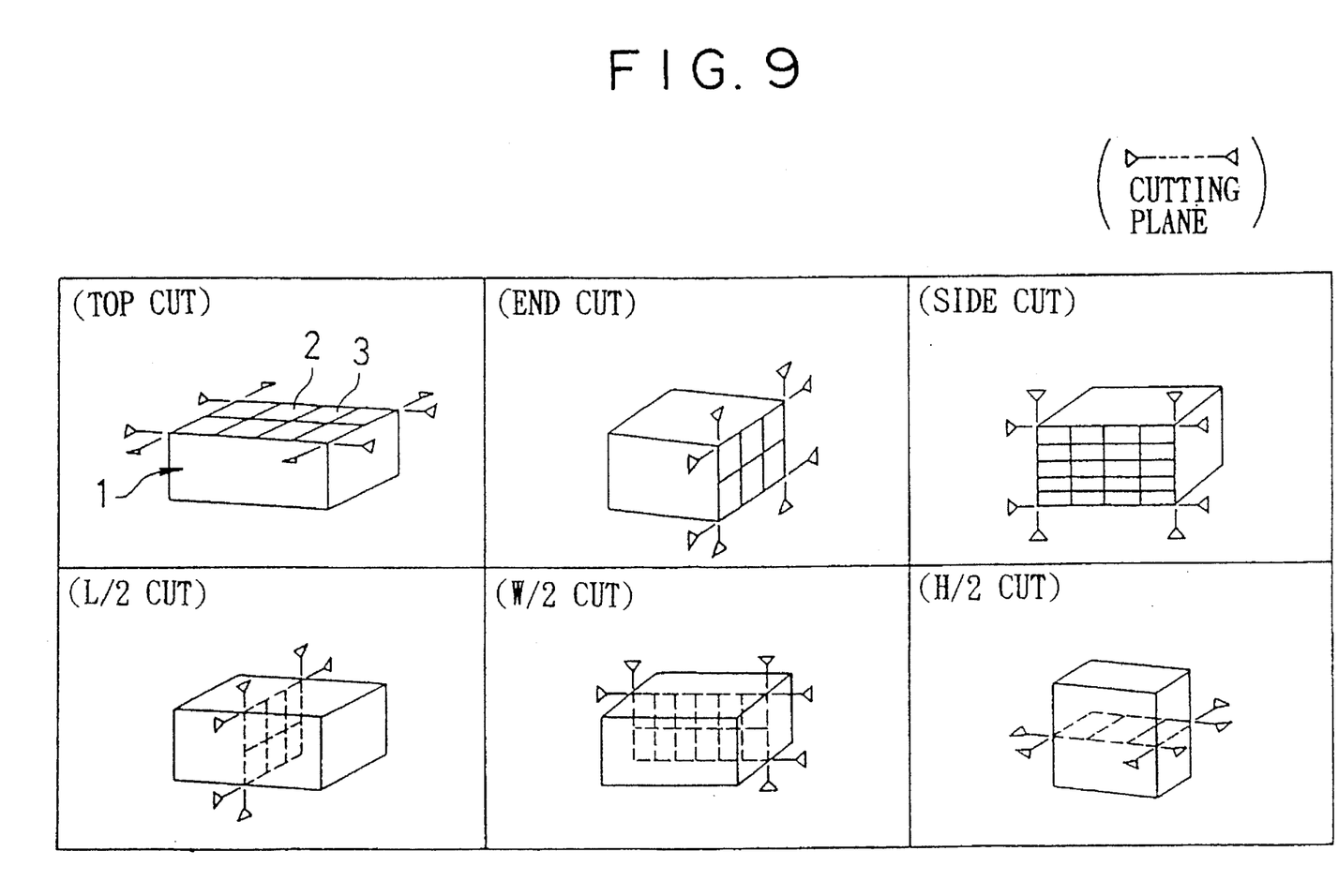
FIG. 9 is a schematic view showing packing box cutting information.

(c) Where the least number of articles in (a) or (b) is an odd number, an end surface of the box perpendicular to the side in (a) or (b) is cut, as in the top cut, end cut or side cut as shown in FIG. 9.

(d) Where the least number of articles in (a) or (b) is an even number, the side in (a) or (b) is cut to 1/2 (i.e., bisected), such as cutting to L/2, W/2 or H/2 as shown in FIG. 9.

Where the least number of articles in (a) or (b) is an odd number $(2n+1, n=1, 2, \ldots )$, the side in (a) or (b) may be cut to $n/(2n+1)$ as well. For example, with three columns of articles, the cutting may be made between the second and first columns. With five columns, the cutting may be made between the third and second columns. Likewise, cutting which is nearly bisecting may be made.

Figure 10:
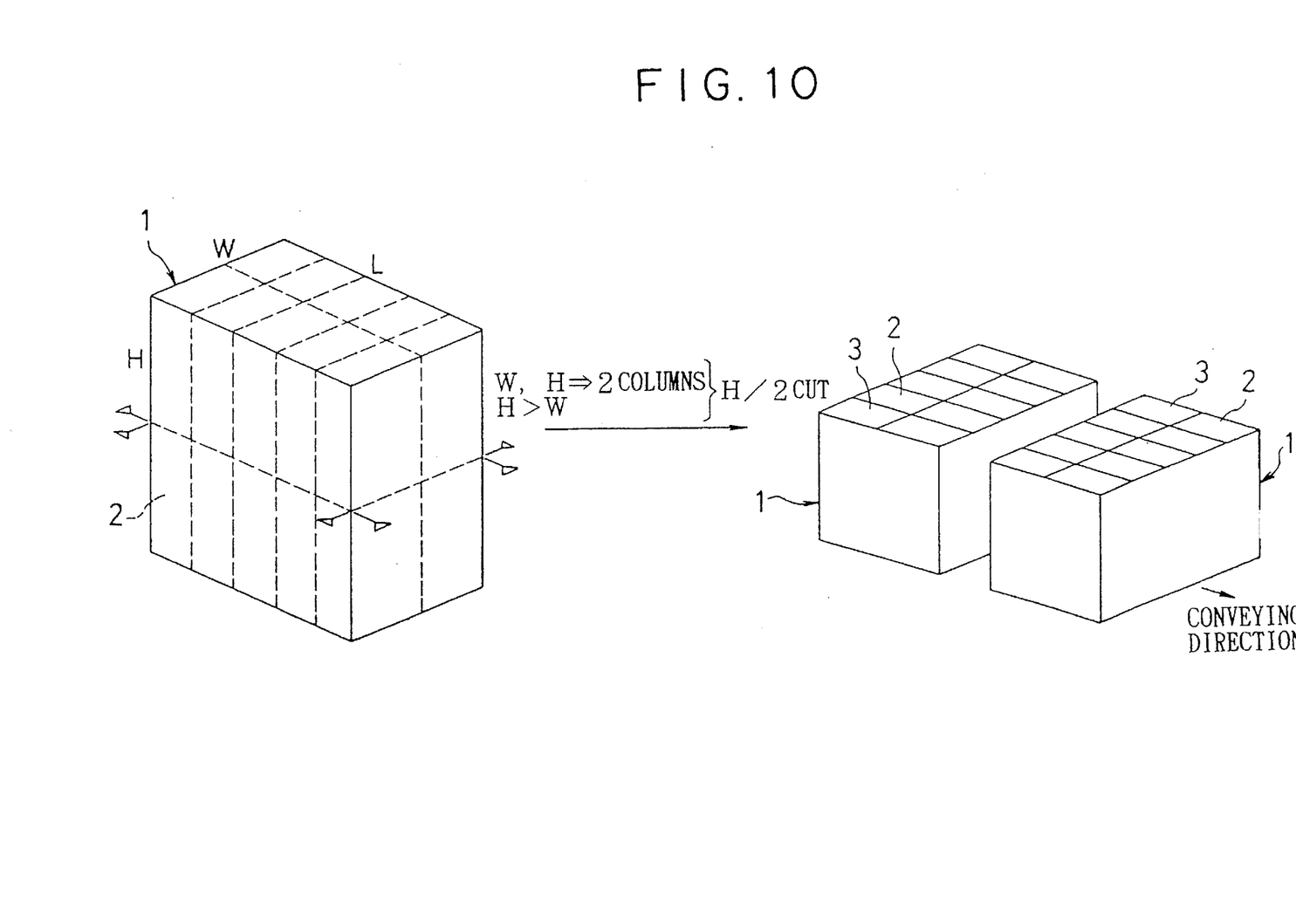
FIG. 10 is a schematic view showing an example cutting a packing box.

In the example shown in FIG. 10, there are five columns in the L direction, two columns in the W direction, and two columns in the H direction. Thus, the cutting is made in the W or H direction. Further, since the H direction size is greater than the W direction size, the H direction side is bisected in a plane perpendicular to it. Consequently, when articles are taken out through the open side of the packing box, the greatest number of thins in an array are found on the top and bottom sides. In this case, the articles can be taken out in a stable fashion.

(3) Packing Box Supplying Step

The packing boxes 1 which have been transferred from each cutting line 23 to the supply line 25 are brought with the opening 3 directed up by supply car 27 to pertinent storage spaces of the movable shelf unit 21.

(4) Packing Box Storing Step

Each packing box 1 that has been brought to the movable shelf unit 21 slides down along a forwardly downwardly inclined roller surface thereof. The first packing box 1 is stopped by a stopper 28 to wait for its delivery to a picking unit 30.

Figure 3:
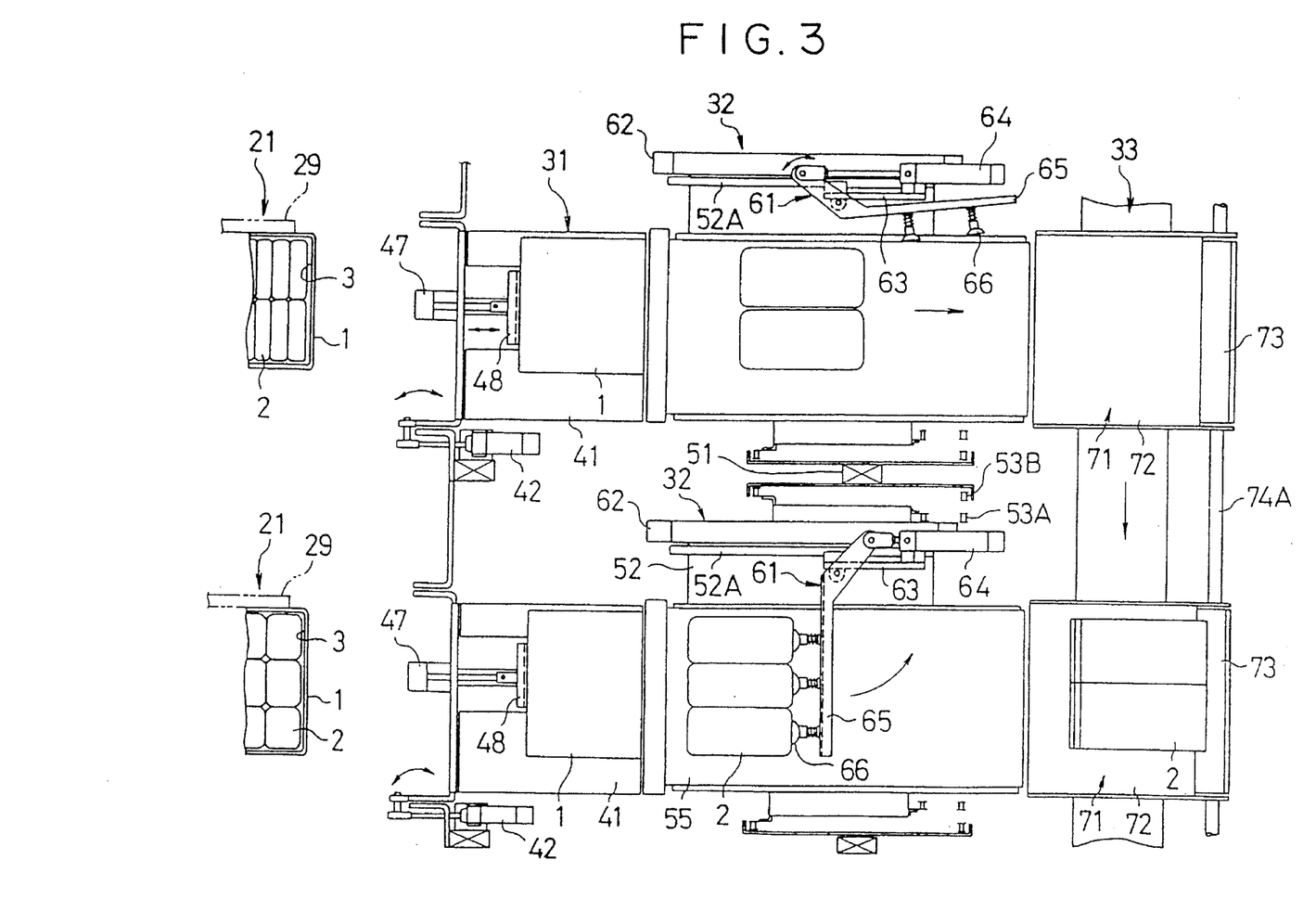
FIG. 3 is a plan view showing the picking apparatus.

Each packing box 1 having been brought to the movable shelf unit 21 is led through a vertical storage space. A side surface of the packing box 1 is thus brought to a fixed position with respect to the picking unit 30. In FIG. 3, the left side surface of the packing box 1 is led along a guide rail 29 of the movable shelf unit 21. Thus, the packing box 1 is brought to a fixed position relative to an article sucking position in the picking unit 30.

Figure 7:
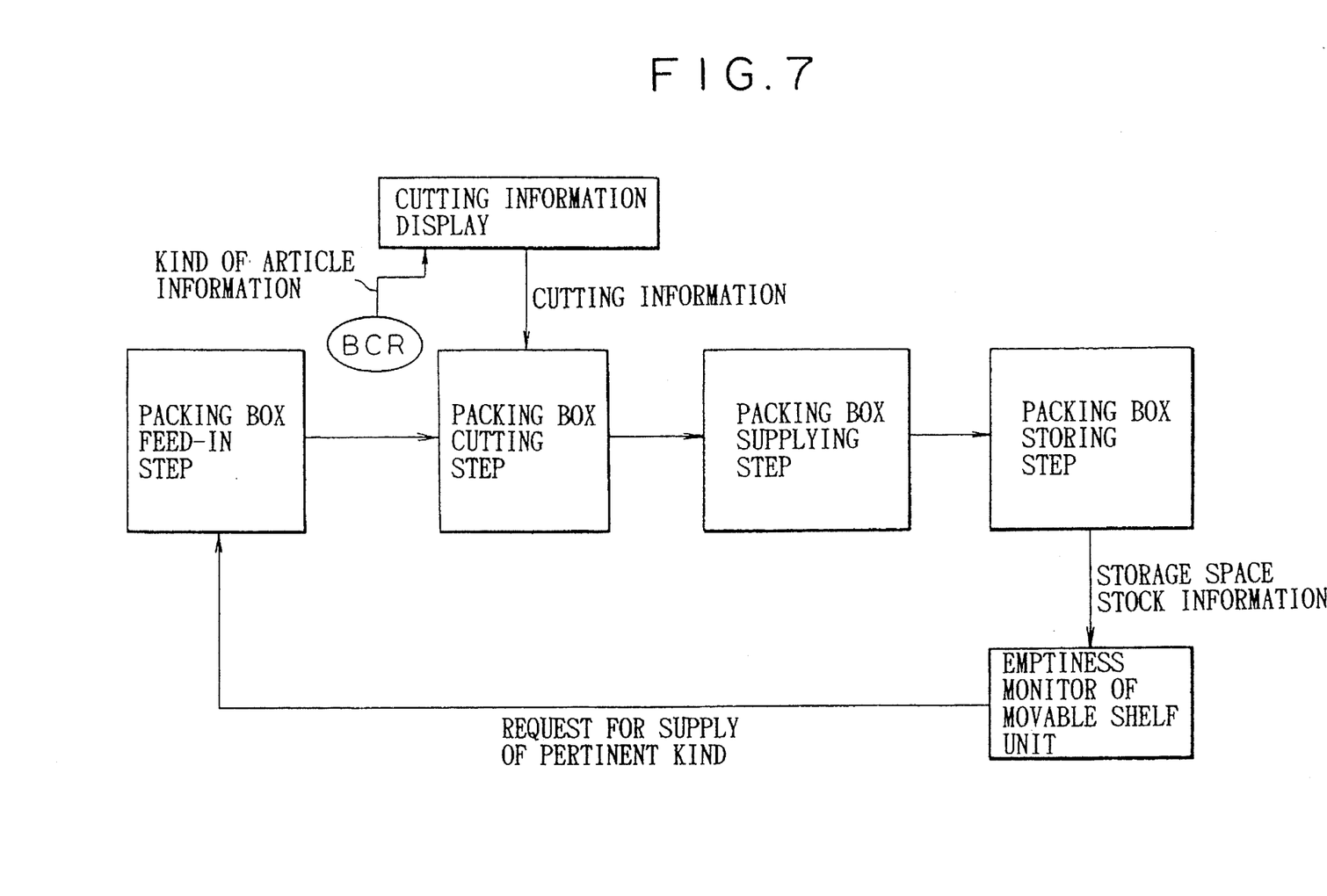
FIG. 7 is a flow chart illustrating the process of replenishing a movable shelf unit with articles.

Thus, the process of replenishing the movable shelf unit 21 with articles is executed in a procedure as shown in (① to ④ below (see FIG. 7).

① Packing Box Feed-in Step

The computer stores real time stock information of each storage space that is output from the emptiness monitor of the movable shelf unit 21. When the emptiness of a certain storage space of the movable shelf unit 21 exceeds that corresponding to one layer of a pertinent pallet stack, the automatic case pick-out apparatus takes out one layer of packing boxes 1 accommodating articles of a pertinent kind. These packing boxes I are led on the packing box conveyor to the cutting line 23.

② Packing Box Cutting Step

The computer displays cutting information about the packing boxes 1 introduced to either cutting line 23 on a cutting information display 24. According to this display, the operator cuts apart each packing box 1 to form an open side 3.

③ Packing Box Supplying Step

Each packing box 1 with the open side 3 thus formed is supplied from the cutting line 23 to the supply line 25.

④ Packing Box Storing Step

Each packing box 1 supplied to the supply line 25 is stored in the pertinent storage space of the movable shelf unit 21.

(B) Process of Picking Out Articles From Movable Shelf Unit 21

The picking unit 30 comprises a packing box setter 31, a packing box take-out unit 32, a collecting conveyor 33 and an empty packing box conveyor 34. The picking unit 30 takes out a required number of articles 2 from a pertinent storage space of the movable shelf unit 21 according to order data. The removed articles 2 are collected on an article receptacle 71 of the collecting conveyor 33. The operator transfers the collected articles 2 from the article receptacle 71 to a container 4. The articles thus transferred to the container 4 is subsequently delivered to a corresponding shop. This pick-out process, as shown in FIG. 1, has (1) picking out preparation step, (2) article take-out step, (3) article collecting step and (4) article transfer step to the container. Now, equipment for each step will be described, and then the procedure of the article pick-out process will be described.

Figure 2:
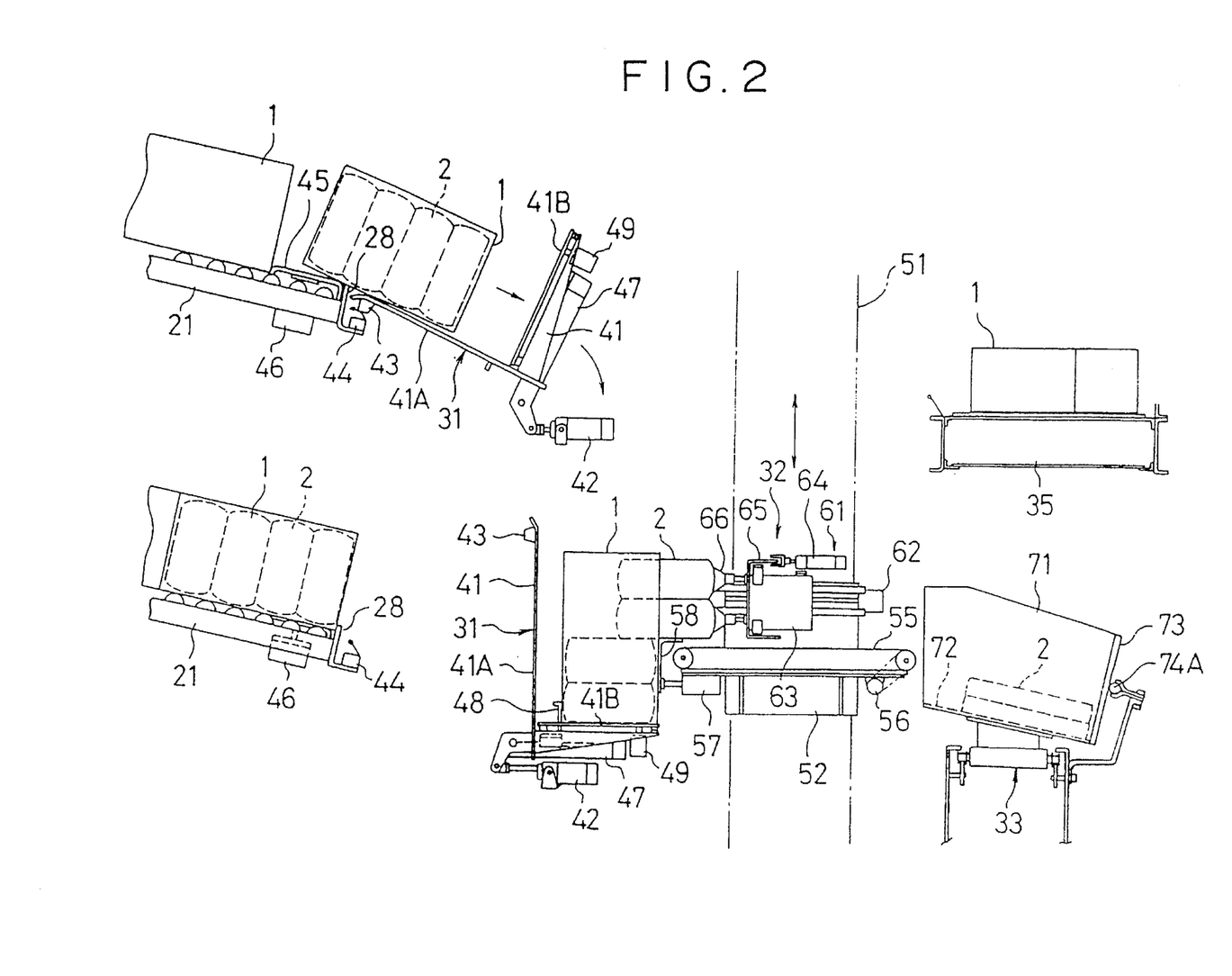
FIG. 2 is a front view showing the picking apparatus.
Figure 5A:
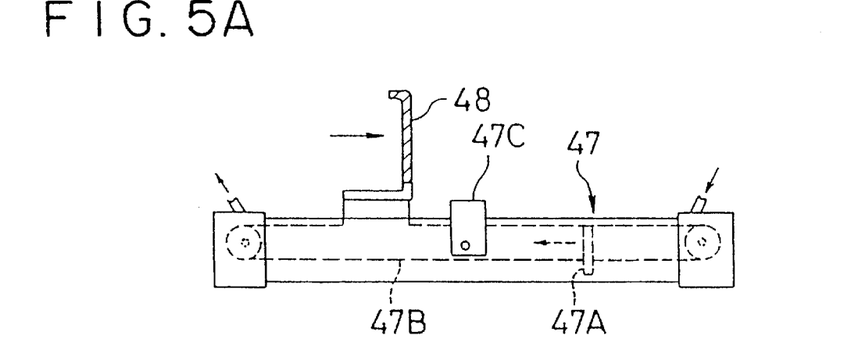
FIGS. 5A and 5B are schematic views showing a positioning pusher in a packing box setter.
Figure 5B:
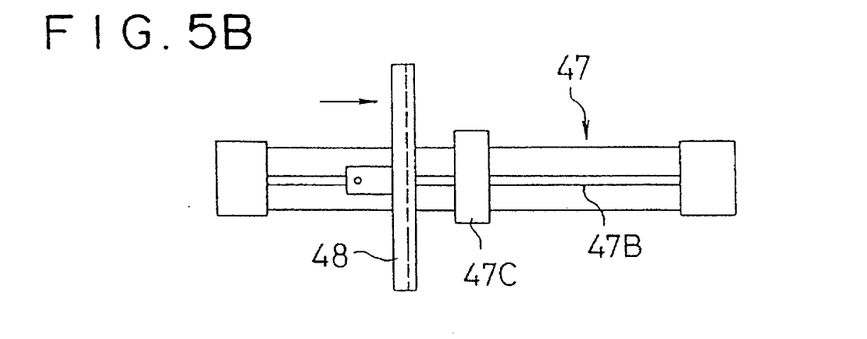

(1) Picking Out Preparation Step (see FIGS. 2, 3 and 5)

The packing box setter 31 is disposed in front of each storage space of the movable shelf unit 21. It sets the orientation of each packing box 1 delivered from each storage space of the movable shelf unit 21 such that the opening 3 of the packing box 1 is directed side-wise and faces a suction position of an article take-out unit 32.

A packing box support base 41 is rotatably supported on the packing box setter 31. The packing box support base 41 can be switched by a revolving cylinder 42 to a packing box receiving position and an article take-out position. It has a first and a second table 41A and 41B.

When the packing box supporting base 41 is switched to the packing box receiving position, a push button 43 provided on the underside of an end of the first table 41A depresses and turns on a delivery switch 44 provided on a delivery end of the movable shelf unit 21, thus producing an "on" signal. According to this "on" signal, a delivery plate 45 which has been held underneath a delivery end side roller of the movable shelf unit 21 is projected upward from that roller by a delivery cylinder 46. Thus, the leading end packing box 1 held on the roller by the stopper 28 is raised above the stopper 28, so that it is allowed to slide down the first table 41A. After the packing box 1 has been slided down, the delivery plate 45 is again brought underneath the roller by the delivery cylinder 46. As a result, the next packing box 1 is allowed to slide down over the roller to be stopped by the stopper 28.

When the packing box support base 41 is switched to the take-out position, the packing box 1 is transferred from the first table 41A to the second table 41B, and its open side 3 is thus directed side-wise. As shown in FIG. 5, the packing box support base 41 has a packing box push-in cylinder 47 under the second table 41B. This cylinder 47 has a pusher plate 48 for pushing the packing box 1 on the second table 41B to the suction position of the take-out unit 32. At this time, a lift frame 51 of the take-out unit 32 is found in front of the packing box support base 41. Also at this time, a positioning plate 58 has been set by a positioning cylinder 57 of the lift frame 41 at a suction regulation position. Thus, the packing box 1 pushed on the second table 41B by the pusher plate 48 is positioned by the positioning plate 58 to a side-wise position such that its open side 3 faces the suction position of the take-out unit 32. In the packing box push-in cylinder 47, as shown in FIG. 5, an air-driven rodless cylinder, and the pusher plate 48 is coupled to a winding member 47B which is driven by a movable member 47A of the push-in cylinder 47. The pusher plate 48 also has a stopper 47C.

The second table 41B of the packing box support base 41 can be revolved by an empty box kick-out cylinder 49. Thus, an empty packing box 1 after taking out all the articles 2 from it, can be taken out onto a delivery conveyor 55 on the lift frame 52. The empty packing box 1 having been taken out onto the delivery conveyor 55 is transferred onto an empty packing box conveyor 35 by driving the conveyor 55. At this time, the lift frame 51 of the article take-out unit 32 is lifted or lowered to position a delivery surface of the delivery conveyor 55 to a level for delivery of the empty packing box to the empty packing box conveyor 35.

Figure 6A:
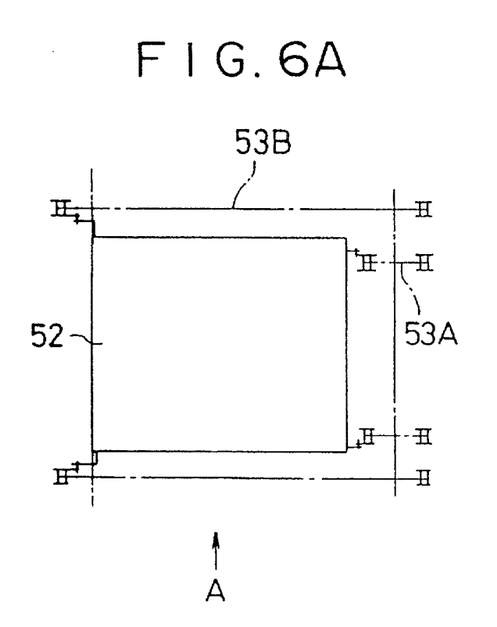
FIGS. 6A and 6B are schematic views showing a lift chain of a discharger.
Figure 6B:
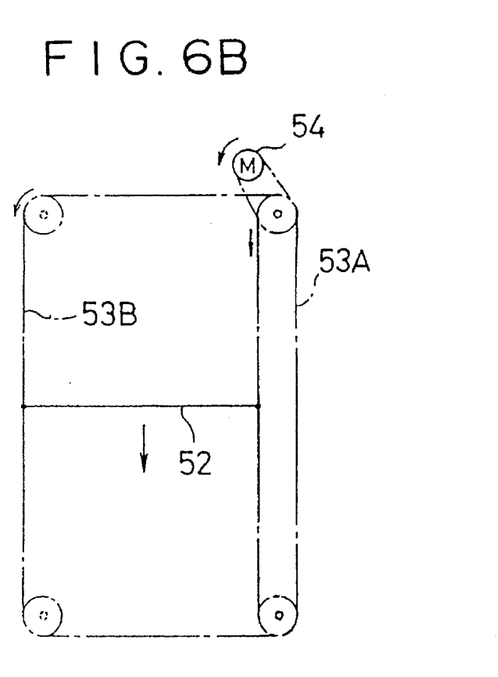

(2) Article Take-Out Step (see FIGS. 2, 3 and 6)

The article take-out unit 32 has a vertically extending lift frame support pillar 51 provided for each column of the movable shelf unit 21. The lift frame 52 can be moved along the pillar 51 to be positioned in front of packing box setter 31 of a desired one of storage spaces from the lowermost to the uppermost ones. The lift frame 52 is coupled to chains 53A and 53B and can be lifted and lowered by a chain drive motor 54.

The lift frame 52 has a delivery conveyor 55 which can be driven by a drive motor 56. The positioning cylinder 57 and positioning plate 58 mentioned above are disposed beneath the conveyor 55.

The lift frame 52 has a picking and sucking unit 61. In the picking and sucking unit 61, a slide base 63 which can be moved back and forth by a slide cylinder 62 is supported on a slide guide 52A of a frame 52. Also, a revolving arm 65 which can be revolved by a suction pad escape cylinder 64 is supported on the slide base 63. The revolving arm 65 has vacuum suction pads 66 arranged in three columns each of two pads one above another. The suction pads 66 of the revolving arm 65 can be switched by the escape cylinder 64 between an article suction position above the delivery conveyor 55 and an escape position side-wise of the conveyor 55.

In the take-out unit 32, the suction pads 66 are reciprocated with respect to the open side 3 of packing box 1 having been positioned side-wise by the packing box setter 31 such as to face the suction position, and suck surfaces of a required number of articles 2 in the packing box 1. The required number of sucked articles 2 are pulled out from the packing box 1 through the side-wise directed open side 3 to be taken out onto the conveyor 55.

Figure 11A:
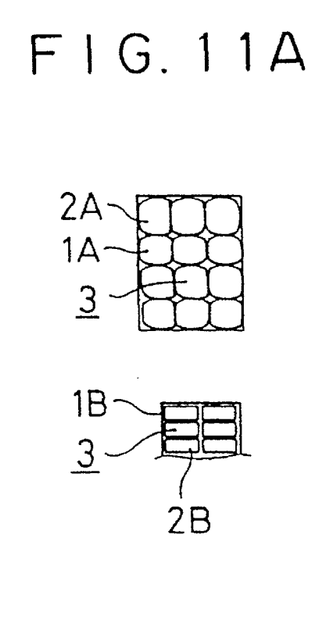
FIGS. 11A and 11B are views showing an example of picking out articles by the picking apparatus.
Figure 11B:
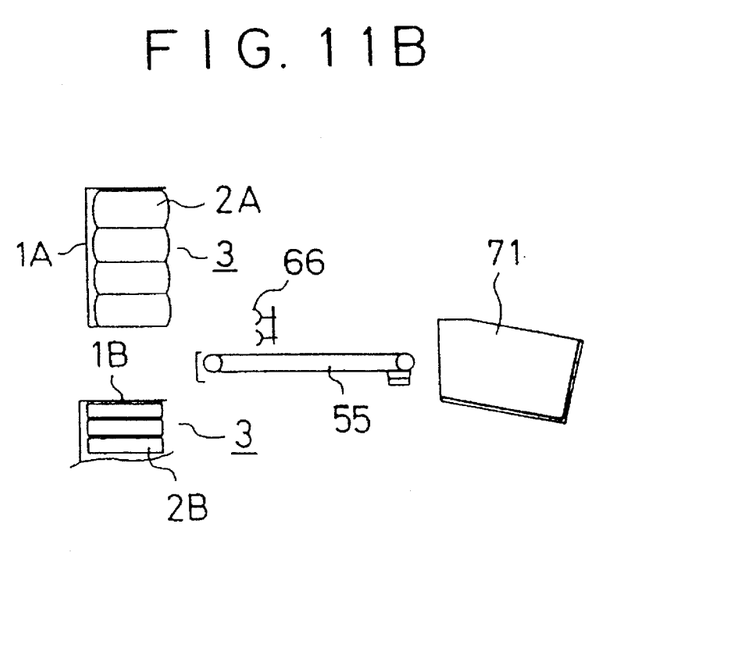

As shown in FIG. 11, the suction pads 66 are arranged in three columns each of two pads one above another as described before, so that they can simultaneously suck one layer of thick articles 2A in packing box 1A and two layers of thin articles 2B in packing box B. As for the articles 2A, a desired number of articles 2 in one layer can be sucked at a time by independently turning on and off the three suction pads 66 in the lower layer. As for the articles 2B, on the other hand, a desired number of articles 2 in two layers can be sucked at a time by independently turning on and off the suction pads 66 in the left and right columns of the upper layer and lower layer.

The suction pads 66 of the take-out unit 32 take out articles 2 in the packing box 1 successively from those in upper layers.

(3) Articles Collecting Step (see FIGS. 2 and 3)

The collecting conveyor 33 is provided such that it crosses the front of the take-out unit 32 described above, provided for each column of the movable shelf unit 21. The conveyor 33 has a number of article receptacles 71 provided at a pitch corresponding to the pitch of the storage spaces of the movable shelf unit 21. Each article receptacle 71 can be brought to the front of each take-out unit 32 to collect articles 2 having been taken out onto the conveyor 55 of each take-out unit 32 and transport the collected articles 2 to an article storage unit 81.

The article receptacle 71 has a receiving surface 72 which is inclined forwardly downward in the deliver direction from the conveyor 55. The article receptacle 71 has a receiving wall 73 which can be opened and closed. (a) In the collecting step, in which the article receptacle 71 is brought to the front of each take-out unit 32, the receiving wall 73 is supported by a guide rail 74A provided on the take-out unit 32 and set at a receiving position. (b) When the article receptacle 71 reaches the article storage unit 81, the receiving wall 73 is opened from the receiving position to a discharging position while it is supported on a guide rail 74B which is rocked by an opening/closing cylinder 75 provided on the rack of the collecting conveyor 33 (see FIG. 4). When the receiving wall 73 is opened to the discharging position, it has a forwardly downward inclination continuous to the inclination of the receiving surface 72, thus allowing collected articles 2 on the receiving surface 72 to slide out from the article receptacle 71 into the container 4.

Figure 12A:
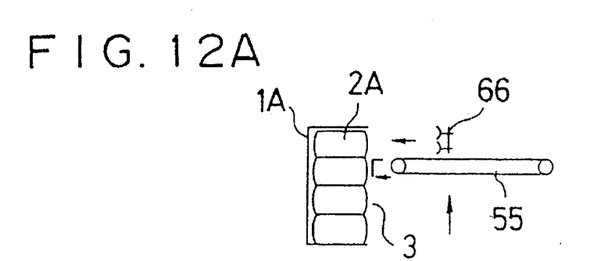
FIGS. 12A to 12H are schematic views illustrating a pick-out procedure.

At the time of collection of articles 2 from the delivery conveyor 55 of the take-out unit 32 to the article receptacle 71 on the collecting conveyor 33, the conveyor 55 is lowered from above the article receptacle 71 (or raised from below the article receptacle 71) by the lift frame 52. At this time, the level of the receiving surface 72 of the article receptacle 71 or the level of the top surface of the previously collected articles 2 in the article receptacle 71, is detected by a level sensor (i.e., reflection type photo-sensor) which is mounted on the underside of the conveyor 55. According to the result of detection, the delivery surface of the conveyor 55 is set to a level higher than the level of the receiving surface 72 or the top level of the previous collected articles 2 (FIGS. 12C, 12E and 12G). Succeeding articles 2 are thus delivered from the delivery surface of the conveyor 55 to be collected onto the receiving surface 72 of the article receptacle 71 or onto the previous collected articles 2 in the article receptacle 71 (FIGS. 12A, 12F, 12H).

Figure 14:
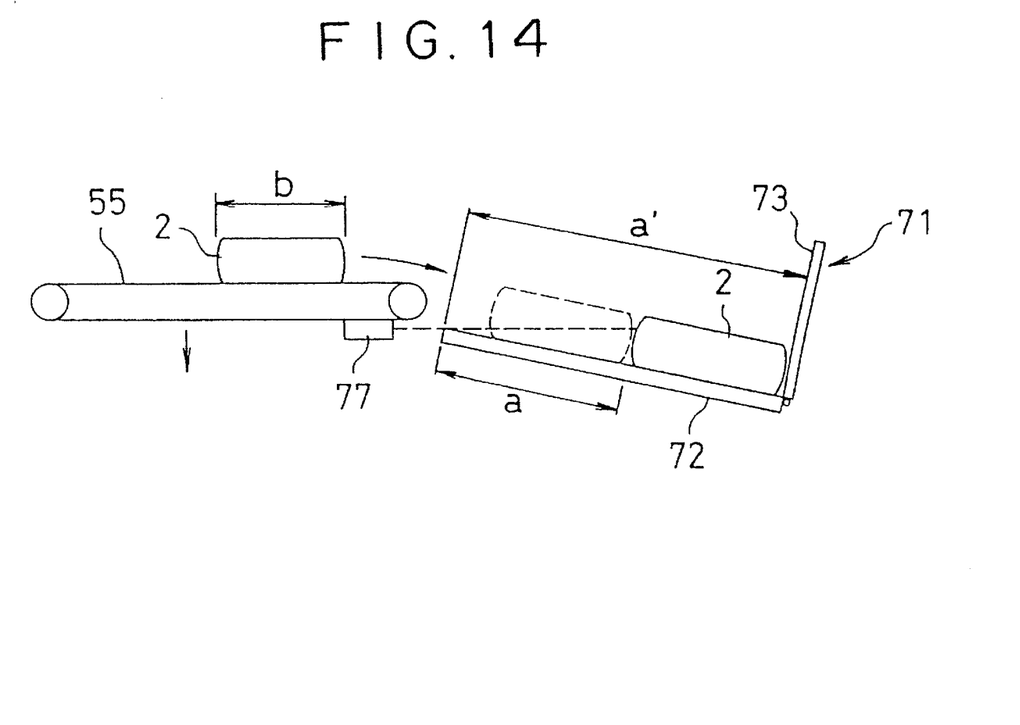
FIG. 14 is a schematic view showing a modified process of collecting articles on an article receptacle.

FIG. 14 shows a modified example of the operation of collecting articles 2 from the conveyor 55 of the take-out unit 32 onto the article receptacle 71 on the collecting conveyor 33. Specifically, while the delivery conveyor 55 is lowered from above the article receptacle 71 (or raised from below the article receptacle 71) by the lift frame 52, a distance sensor 77 which is mounted on the underside of the conveyor 55 measures the distance of an obstacle (the receiving wall 73 or side wall of stacked articles 2), which is present over the receiving surface 72 of the forward article receptacle 71 on the conveyor 55 or over previous collected articles 2. From the measured distance, the size (a or a') available for accommodation of articles in the article receptacle 71 is determined. When this available size becomes smaller than the size (b) of the succeeding thing to be accommodated, the descent (or ascent) of the conveyor 55 is stopped. Then, the succeeding articles 2 are delivered from the delivery surface of the conveyor 55 to be transferred and collected onto the receiving surface 72 of the article receptacle 71 or onto the previous collected articles 2.

Figure 4:
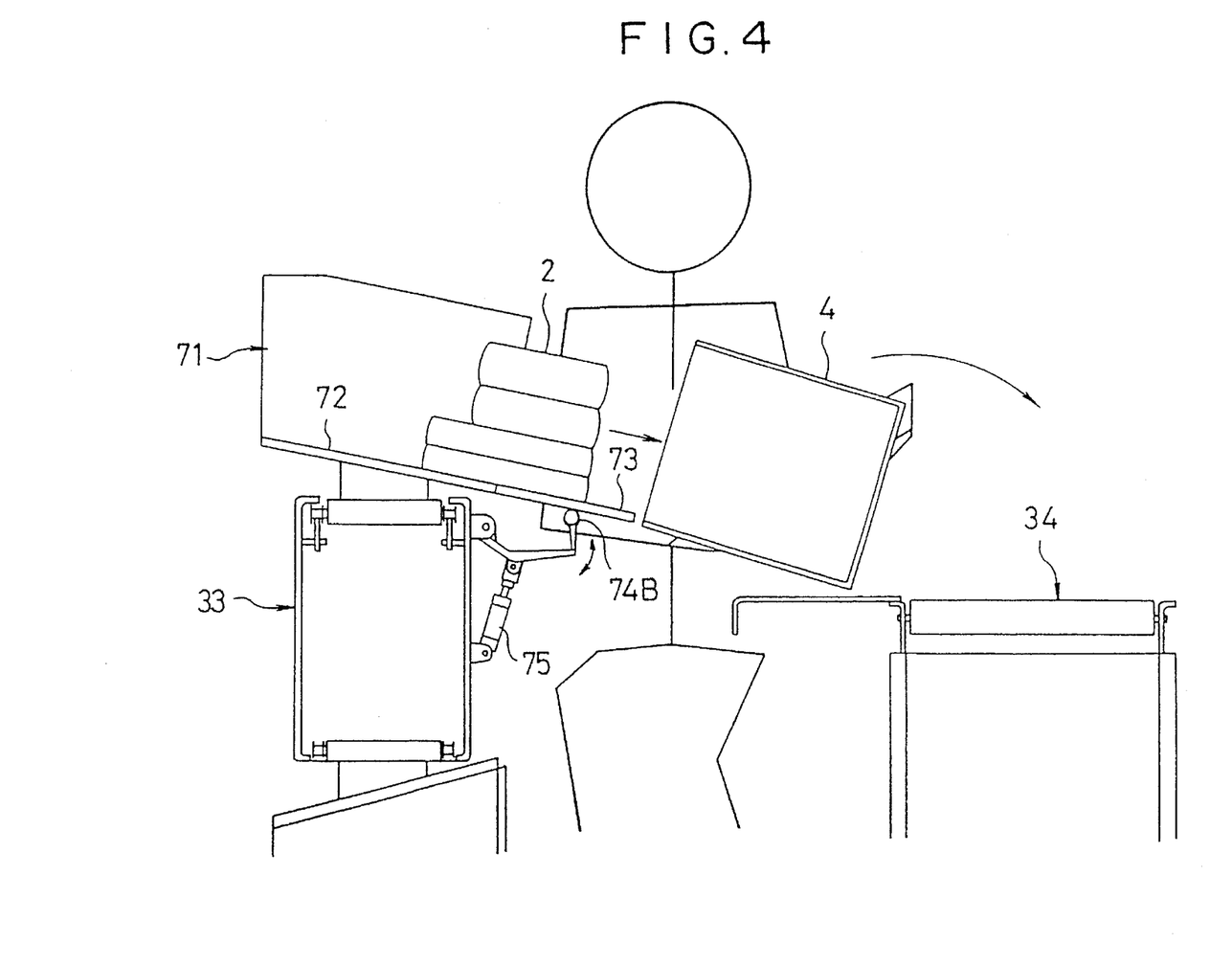
FIG. 4 is a front view illustrating a step of charging articles into a container.

(4) Transferring Step (see FIG. 4)

The storage unit 81 is set at a position, which is finally reached by the article receptacle 71 on the collecting conveyor 33 after being brought to the front of the individual take-out units 32. In the storage unit 81, articles 2 collected on the article receptacle 71 are transferred by the operator into the container 4. The operator turns on an opening switch of the article receptacle 71 while holding the container 4 in a state of substantial match with the inclination angle of the receiving surface 72 of the article receptacle 71. As a result, the opening/closing cylinder 55 of the article receptacle 71 is operated to cause the receiving wall 73 of the article receptacle 71 to turn down and be set to the forwardly downward inclination continuous to the inclination of the receiving surface 72 as mentioned above, thus allowing the articles 2 in the article receptacle 71 to enter the container 4 while holding the laminated state.

The articles 2 of each kind which have been taken out from a pertinent storage space of the movable shaft unit 21, are delivered on a container conveyor 34 to a corresponding shop.

It is possible to use as the container 4 an empty packing box 1, which has been made empty on the packing box support base 41 of the packing box setter 31 and transferred onto the empty packing box conveyor 35 as noted above.

Thus, the process of taking out articles by the picking unit 30 is executed in a procedure as shown in ① to ③ below (see FIG. 8). A case is taken, in which four thick articles 2A in a packing box 1A and four thin articles 2B in a packing box 1B are collected as shown in FIG. 11.

① Picking Out Preparation Step

A packing box 1 of one kind is delivered from the end of a pertinent storage space in the movable shelf unit 21. This packing box 1 is received in the first table 41A of the packing box support base 41 which has been set to the packing box receiving position by the packing box setter 31.

Then, the packing box support base 41 is set to the take-out position, and the packing box 1 is transferred from the first table 41A to the second table 41B and then turned down so that its open side 3 is directed side-wise.

Then, the packing box 1 is positioned with the pusher plate 48 in the packing box setter 31 and the positioning plate 58 of the take-out unit 32. Thus, the open side 3 of the packing box 1 is positioned to a side-wise position facing the suction position of the take-out unit 32.

② Delivering and Collecting Steps

The delivery conveyor 55 of the take-out unit 32 is raised, and the suction pads 66 of the conveyor 55 are positioned to a suction position facing the uppermost layer articles 2A via the side-wise open side 3 of the packing box 1A (FIG. 12A).

Figure 12B:
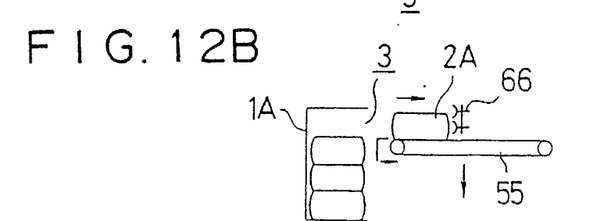
Figure 12C:
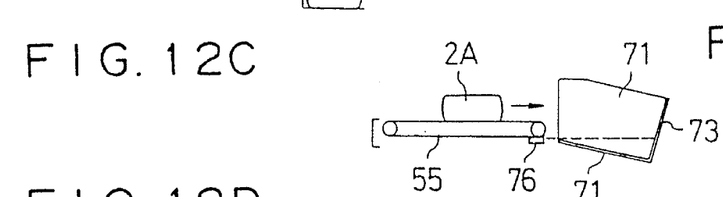

Then, three uppermost layer articles 2A are sucked by three lower layer suction pads 66 to be pulled out and taken out through the opening 3 of the packing box IA onto the delivery surface of the conveyor 55 (FIG. 12B).

Then, the suction pads 66 are set to their escape position, and the three articles 2A on the delivery surface of the conveyor 55 are delivered into the article receptacle 71 (FIG. 12C). At this time, with the conveyor 55 caused to be lowered from above the article receptacle 71 (or raised from below the article receptacle 71), the level of the receiving surface 72 of the article receptacle 71 is detected with the level sensor 76 under the conveyor 55. From the result of this detection, the delivery surface of the conveyor 55 is set to a level higher than the level of the receiving surface 72 (the descent of the conveyor 55 being stopped at an instant when light protected from the level sensor 76 is no longer returned from the receiving wall 73 (i.e., reflecting tape provided thereon) of the article receptacle 71), and the delivery of articles from the conveyor 55 as described above is caused.

Figure 12D:
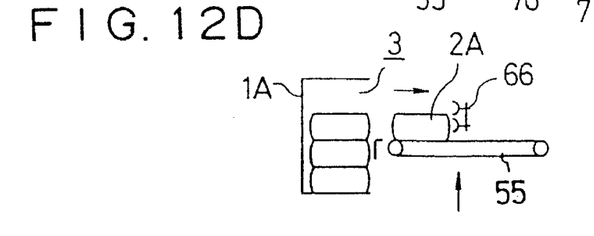
Figures 12E, 12F:
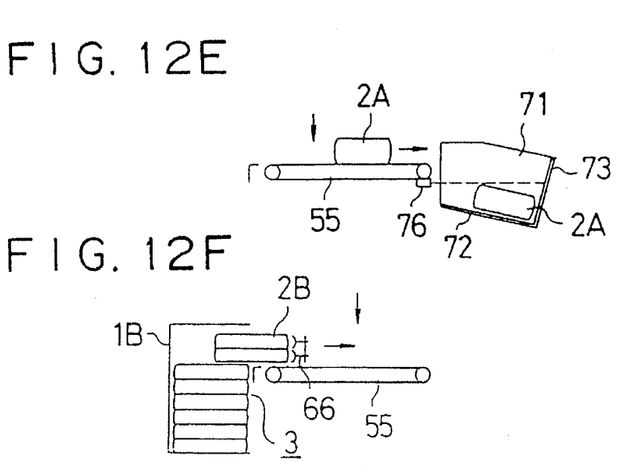
Figure 12G:
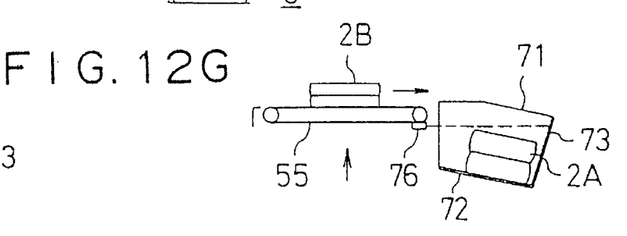
Figure 12H:
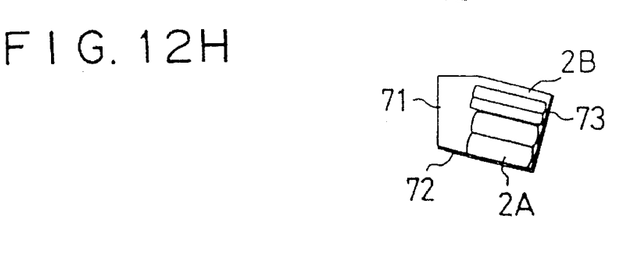

Then, the conveyor 55 of the take-out unit 32 is raised again to be positioned to the suction position to face the second layer of articles 2A via the side-wise open side 3 of the packing box 1A. Then, one second layer thing 2A is sucked by one lower layer suction pad 66 to be pulled and taken out through the opening 3 of the packing box IA onto the delivery surface of the conveyor 55 (FIG. 12D).

Then, the suction pads 66 are set to the escape position, and the single thing 2A on the delivery surface of the conveyor 55 is delivered to the article receptacle 71 (FIG. 12E). At this time, with the conveyor 55 caused to be lowered from above the article receptacle 71 (or raised from below the article receptacle 71), the top level of the previous collected articles 2A is detected with the level sensor 76 under the conveyor 55. From the result of this detection, the delivery surface of the conveyor 55 is positioned to a level higher than the top level of the previous collected articles 2A, the descent of the conveyor 55 being stopped at an instant when light projected from the level sensor 76 is no longer returned from the receiving wall 73 (i.e., reflecting tape provided thereon) of the article receptacle 71, and then the delivery of articles from the conveyor 55 as described above is caused.

Then, the conveyor 55 of the take-out unit 32 is raised once again to be positioned to the suction position to face the uppermost and second layer articles 2B via the side-wise opening 3 of the packing box 1B. Then, four articles 2B in the upper and lower layers are sucked by four suction pads 66 in the upper and lower layers to be pulled and taken out through the opening 3 of the packing box 1B onto the delivery surface of the conveyor 55 (FIG. 12F).

Then, the suction pads 66 are set to the escape position, and the four articles 2B on the delivery surface of the conveyor 55 are delivered to the article receptacle 71 (FIG. 12G). At this time, with the conveyor 55 caused to be lowered from above the article receptacle 71 or raised from below the article receptacle 71, the top level of the previously collected articles 2A is detected with the level sensor 76 under the conveyor 55. From the result of the detection, the delivery surface of the conveyor 55 is positioned to a level higher than the top level of the previously collected articles 2A, the descent of the conveyor 55 being stopped at an instant when light projected from the level sensor 76 is no longer returned from the receiving wall 73 (i.e., reflecting tape provided thereon) of the article receptacle 71, and the delivery of articles from the conveyor 55 as described above is caused.

If it is necessary to add separate ordered articles 2 to the article receptacle 71, the article receptacle 71 is fed on the collecting conveyor 33 to the front of a take-out unit 32 as the next destination for collection, and then after repeatedly executing the delivering and collecting steps as noted above in front of this take-out unit 32 it is transported up to the storage unit 81 (FIG. 12H).

③ Container Transferring Step

In the storage unit 81, the operator transfers the articles 2 that are collected in the article receptacle 71 to the container 4. At this time, the operator has the container 4 inclined by an angle substantially matched to the inclination angle of the receiving surface 72 of the article receptacle 71 and depresses the opening switch. As a result, the receiving wall 73 is turned down, whereby the articles 2 in the article receptacle 71 are transferred in the stacked state to the container 4.

The container 4 which has thus accommodated the articles 2 is transported on the container conveyor 34 to be delivered to a corresponding shop.

In the packing box setter 31 which corresponds to each storage space of the movable shelf unit 21, when the packing box 1 becomes empty with all the articles 2 taken out from it, the empty packing box 1 is discharged in a procedure of the following steps ① to ④, and a new packing box 1 is set.

Figure 13A:
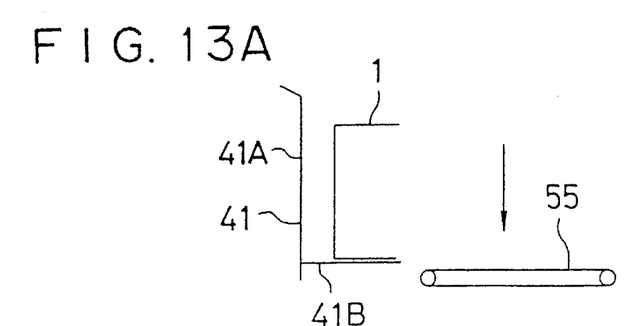
FIGS. 13A to 13E are schematic views showing a procedure of transferring a packing box with articles to a packing box setter.

① The computer is in real time storing the number of articles accommodated in the packing box 1 set in the packing box setter 31 of each storage space, and the conveyor 55 of the take-out unit 32 is positioned at the front of the packing box setter 31 with the empty packing box 1 therein (FIG. 13A).

Figure 13B:
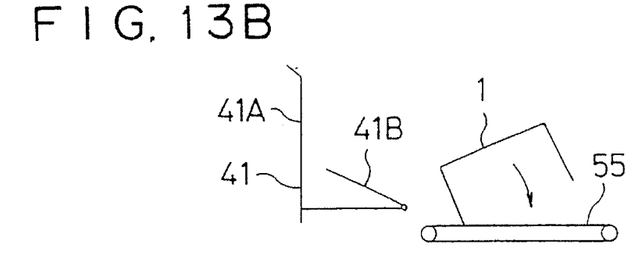

② The second table 41B of the packing box support base 41 in the packing box setter 31 is revolved by the empty box kick-out cylinder 49 to kick out the empty packing box 1 onto the conveyor 55 (FIG. 13B).

Figure 13C:
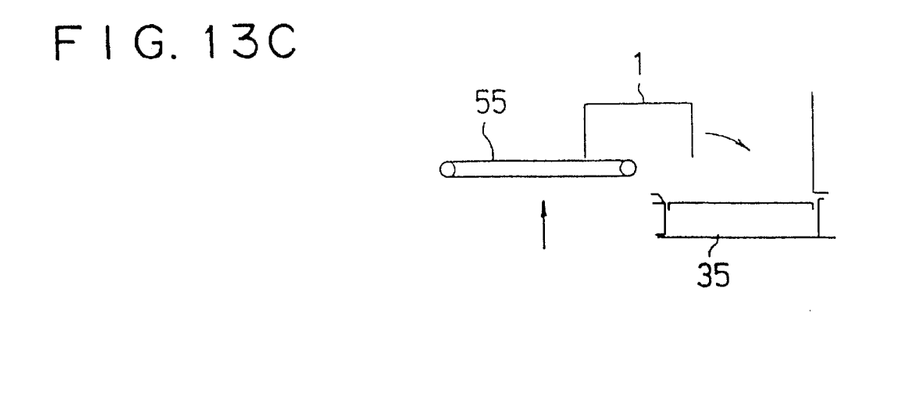

③ The conveyor 55 of the take-out unit 32 is positioned to a level for kicking out the empty packing box onto the empty packing box conveyor 35 to discharge the empty packing box 1 onto the empty packing box conveyor 35 (FIG. 13C).

Figure 13D:
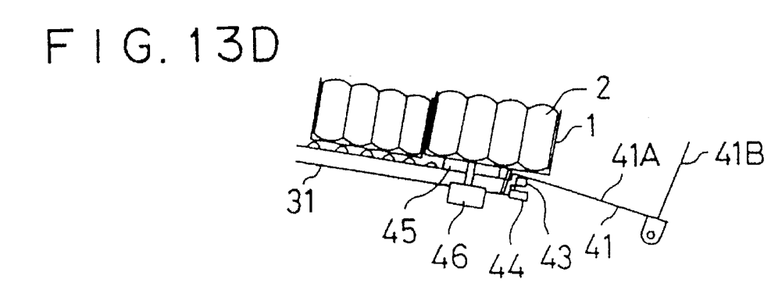
Figure 13E:
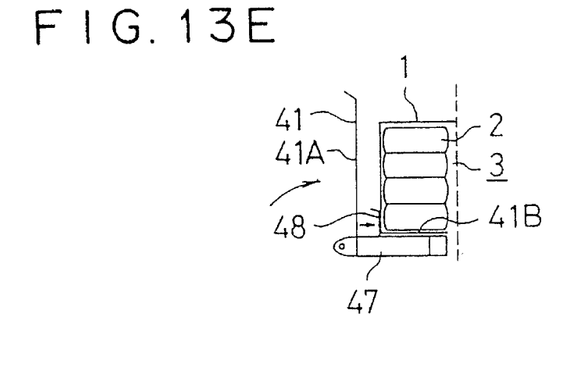

④ In the storage space in which the empty packing box 1 has been kicked out, the packing box support base 41 of the packing box setter 31 is set to the packing box receiving position. As a result, the push button 43 of the first table 41A turns on the delivering switch 44 at the delivering end of the movable shelf unit 21. Thus, as described above, the leading packing box 1 in the movable shelf unit 21 is received in the packing box support base 41 (FIG. 13D).

⑤ The packing box support base 41 is set again to the take-out position, and the packing box 1 is positioned by the pusher plate 48 of the packing box setter 31 and the positioning plate 58 of the take-out unit 32 such that its opening 3 is directed side-wise. The packing box 1 thus positioned is fed to the picking out preparation step described before.

The effects of this embodiment will now be described.

① The articles 2 are taken out in required numbers side-wise from the side-wise directed opening 3 of the packing box 1 by sucking and pulling them. Thus, they can be taken out neatly with forced pull-out force provided by the suction force irrespective of generation of negative pressure in the packing box 1. It is thus possible to readily stabilize the orientation of the articles that have been taken out.

② Since the articles 2 in the packing box 1 are taken out successively from upper ones, the remaining articles 2 have their sides supported by the packing box 1 so that they are not turned down. Thus, the articles 2 in the packing box 1 can always be steadily given forced pull-out force of the suction force.

③ The articles 2 are taken out forcibly in required numbers from the packing box 1 by the forced pull-out force of the suction force. Thus, the articles 2 can be taken out at an increased rate, thus improving productivity.

④ Using such means as the level sensor 76 mounted on the underside of the delivering conveyor 55, the delivery surface of the conveyor 55 is set to a level higher than the top level of previously collected articles 2 in the article receptacle 71, and succeeding articles 2 are stackedly collected on the previously collected articles 2 in the article receptacle 71. Thus, a plurality of articles can be stackedly collected in the article receptacle 71.

⑤ With the above effect ④, a large number of articles 2 can be collected by using a small number of article receptacles 71. It is thus possible to improve the productivity of collecting articles.

⑥ Using such means as the distance sensor 77 mounted on the underside of the delivering conveyor 55, the size available for accommodation of articles on the receiving surface 72 of the article receptacle 71 or on previously collected articles is measured. When the available size becomes less than the size (b) of succeeding articles, the descent or ascent of the delivering conveyor 55 is stopped. At this time, a size (a) available for accommodation greater than the size (b) of the succeeding articles is secured on the receiving surface 72 or previously collected articles thereon of the article receptacle 71, to which succeeding articles are delivered from the delivery surface of the delivering conveyor 55 (at a level above the distance sensor). Thus, the succeeding articles 2 are delivered to and collected on the receiving surface 72 or on previously collected articles thereon of the article receptacle 71. That is, the succeeding articles are stackedly collected on the previously collected articles in the article receptacle 71. Further, articles 2 can be collected in parallel in the depth direction (i.e., forwardly downward direction) on the receiving surface 72 or on previously collected articles thereon. That is, articles 2 can be collected in a stack and parallel in the depth direction in the article receptacle 71, and thus a large number of articles 2 can be collected in the article receptacle 71.

According to the invention, as shown in the foregoing, it is possible to take out articles in a orderly fashion and with high productivity from the packing box.

While the preferred embodiments of the invention have been described in detail with reference to the drawings, they are by no means limiting, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to tile present invention without departing from the spirit and scope thereof. Therefore, the present invention should not be understood as limited to the specific embodiment set out above but to include all possible embodiments which can be embodied within a scope encompassed and equivalents thereof with respect to the features set out in the appended claims.

What is claimed is:

1. A method of removing a required number of articles from a packing box having a pair of lengthwise sides (L), a pair of heightwise sides (H) and a pair of widthwise sides (W), which said sides define a box interior for accommodating a plurality of layered articles stacked therein so as to form an array, and having a cut and open side on one side of said box sides, the method comprising steps of:

cutting and removing a selected side of said packing box, thereby creating an open box side;

orienting the packing box such that the open side thereof is directed to a side-wise facing position;

providing a movable article sucking and pick-out means and vertically positioning the sucking and pick-out means in front of said open side of said box to an article sucking position with respect to the articles in an upper layer of the packing box;

moving the sucking and pick-out means towards the articles in said box and then sucking only the required number of upper layer articles to be taken out, said means having a plurality of suction pads corresponding to the arrangement of the articles to be taken out of said box;

pulling and removing the articles via the suction pads by withdrawing the sucking and pick-out means away from the open side of the packing box;

lowering the sucking and pick-out means and positioning the sucking and pick-out means in front of the articles on a succeeding and lower layer of articles in the packing box;

moving the sucking and pick-out means towards the articles and sucking only the required number of articles to be taken out via the same suction pads;

pulling and removing the required number of articles via the suction pads by withdrawing the sucking and pick-out means away from the open side of the packing box, wherein the sucking and pick-out means is repeatedly positioned to an article sucking position on any successively lower layer of articles remaining in said packing box so that all of the articles in the box are removed in the same manner as the articles removed from the upper layer.

2. The method of removing articles according to claim 1, wherein the open side of the packing box is formed by the additional steps of:

(a) cutting a packing box in a plane perpendicular to one of the sides L, W and H of the box in a direction in which the number of articles in the stacked array is least;

(b) cutting the box in a plane parallel to the longest side when there are a plurality of sides in a direction in which the number of articles in the array is least;

(c) cutting an end surface of the box perpendicular to the side in one of steps (a) and (b) when the least number of articles in the array in one of steps (a) and (b) is an odd number; and (d) cutting the side in one of steps (a) and (b) into two parts when the least number of articles in the array in one of steps (a) and (b) is an even number.

* * * * *